(12) United States Patent
Borke et al.

(10) Patent No.: US 6,197,864 B1
(45) Date of Patent: Mar. 6, 2001

(54) FLAME RETARDANT INSULATION COMPOSITIONS HAVING ENHANCED CURABILITY

(75) Inventors: Jeffrey S. Borke, Middletown; Koksal Tonyali, Aurora, both of OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 08/591,895

(22) Filed: Jan. 25, 1996

Related U.S. Application Data

(63) Continuation-in-part of application No. 08/301,939, filed on Sep. 7, 1994, now abandoned.

(51) Int. Cl.⁷ .................. C08J 5/10; C08K 3/10
(52) U.S. Cl. ............... 524/436; 524/409; 524/411; 524/412; 524/469; 524/373
(58) Field of Search .................. 524/411, 409, 524/412, 436, 373, 465, 469

(56) References Cited

U.S. PATENT DOCUMENTS

| | | | |
|---|---|---|---|
| 3,225,018 | 12/1965 | Zutty | 260/88.1 |
| 3,392,156 | 7/1968 | Donaldson | 260/88.1 |
| 3,646,155 | 2/1972 | Scott | 260/827 |
| 3,816,367 * | 6/1974 | Larkin et al. | 260/29.6 R |
| 3,832,326 | 8/1974 | North et al. | 260/42.29 |
| 3,922,442 | 11/1975 | North et al. | 428/447 |
| 4,297,310 | 10/1981 | Akutsu et al. | 264/83 |
| 4,318,845 | 3/1982 | Spivack et al. | 524/91 |
| 4,349,605 | 9/1982 | Biggs et al. | 428/389 |
| 4,373,048 | 2/1983 | Schubert et al. | 524/371 |
| 4,374,219 | 2/1983 | Spivack et al. | 524/91 |
| 4,381,362 | 4/1983 | Biggs et al. | 524/305 |
| 4,397,981 | 8/1983 | Doi et al. | 524/465 |
| 4,578,408 * | 3/1986 | Matsuoka et al. | 524/91 |
| 4,707,520 | 11/1987 | Keogh | 525/245 |
| 4,732,939 | 3/1988 | Kazuo et al. | 525/106 |
| 4,753,992 | 6/1988 | Umpleby | 535/100 |
| 4,795,786 | 1/1989 | Umpleby | 525/326.5 |
| 4,873,042 | 10/1989 | Topcik | 264/211.24 |
| 4,975,480 | 12/1990 | Bullen | 524/294 |
| 5,025,071 | 6/1991 | Bullen | 525/326.5 |
| 5,028,680 | 7/1991 | Bullen | 528/15 |
| 5,225,468 | 7/1993 | Biggs | 524/265 |
| 5,264,515 | 11/1993 | Cody et al. | 528/10 |
| 5,312,861 | 5/1994 | Meverden et al. | 524/521 |
| 5,401,787 * | 3/1995 | Tonyali | 524/101 |

FOREIGN PATENT DOCUMENTS

| | | |
|---|---|---|
| 87302899 | 11/1987 | (EP) . |
| 89310667 | 4/1990 | (EP) . |
| 89121713 | 5/1990 | (EP) . |

* cited by examiner

Primary Examiner—James J. Seidieck
Assistant Examiner—U. K. Rajguru
(74) Attorney, Agent, or Firm—Gerald A. Baracka; William A. Heidrich

(57) ABSTRACT

Improved flame retardant compositions suitable for insulating wire and cable products comprised of ethylene-alkoxy silane copolymer, halogenated organic compound, antimony trioxide, silane condensation catalyst and magnesium hydroxide are provided. Additionally, antioxidant(s), other mineral fillers and other conventional compounding ingredients may be included in the formulations. The compositions have good processability and are capable of being cured under ambient conditions to provide products which meet all of the specifications of SAE J-1128 for thin wall crosslinked polyolefin low tension primary cable insulation. Wire and cable products comprising a metal conductor coated with from 2 to 100 mils of the flame retardant insulation are also disclosed.

18 Claims, No Drawings

FLAME RETARDANT INSULATION COMPOSITIONS HAVING ENHANCED CURABILITY

CROSS-REFERENCE TO RELATED APPLICATIONS

This is a continuation-in-part of application Ser. No. 08/301,939, filed Sep. 7, 1994, now abandoned.

BACKGROUND OF THE INVENTION

1. Field of the Invention

This invention relates to flame retardant ethylene-alkoxy silane copolymer insulation compositions which exhibit good processability and are capable of being cured under ambient conditions.

2. Description of the Prior Art

Crosslinked ethylene polymers are used extensively for wire and cable insulation. Crosslinking improves the mechanical strength, heat resistance and other properties required for most insulation applications.

One type of widely used crosslinkable flame retardant ethylene polymer insulation is comprised of ethylene-vinyl acetate (EVA) copolymer, hydrated organic filler, silane compound and a chemical crosslinking agent, most commonly an organic peroxide. Compositions of this type are disclosed in U.S. Pat. Nos. 3,832,326; 3,922,442; 4,349,605; and 4,381,362. Due to the presence of the chemical crosslinking agent during processing and extrusion, operating conditions are limited and must be carefully controlled to avoid premature crosslinking, commonly referred to as "scorching." Premature crosslinking results in poor extrudate quality. To minimize scorching processors often must use conditions which require them to operate at line speeds below the maximum capabilities of the equipment.

To develop optimal physical properties with the EVA insulations, the coated wire or cable product must be subjected to a fairly rigorous curing operation to crosslink the composition. Curing is accomplished using a continuous vulcanization (CV) line where the extruded wire or cable product is contacted with steam at approximately 400° F. and 200 psi. CV lines are expensive to maintain and operate.

Moisture curable compositions have been developed which eliminate the need for steam curing. These compositions utilize ethylene polymers which have alkoxy silane functionality incorporated into the polymer either by grafting an unsaturated alkoxy silane onto an ethylene polymer or by directly copolymerizing ethylene with an unsaturated alkoxy silane. In the presence of moisture the alkoxy silane groups undergo hydrolysis and condensation reactions to form crosslinks. Silanol condensation catalysts are typically used to increase the rates of hydrolysis and condensation.

Crosslinkable ethylene polymers prepared by grafting unsaturated alkoxy silanes to ethylene polymers are disclosed in U.S. Pat. No. 3,646,155. Crosslinkable ethylene polymers prepared by copolymerizing ethylene with an unsaturated alkoxy silane are disclosed in U.S. Pat. Nos. 3,225,018 and 3,392,156.

Ethylene-alkoxy silane copolymers can also undergo premature crosslinking during processing. Premature crosslinking adversely affects (lowers) the melt index of the resin and, if this occurs to a significant degree, will result in poor processability and unsatisfactory extrudate surface appearance. In extreme cases, extrusion of the ethylene-alkoxy silane copolymer compositions becomes essentially impossible. Therefore, when considering any modifications to silane copolymer formulations for the purpose of improving properties of the resulting insulated product, careful consideration must be given to the effect on processability.

Processing problems are particularly troublesome with formulations which contain a silanol condensation catalyst and with filled compositions since particulate fillers can obtain substantial amounts of moisture. This moisture is released during the mixing and blending operations and hydrolyzes some of the alkoxy groups of the alkoxy silane. The processing problems associated with the use of fillers with ethylene-vinylalkoxy silane copolymers are well documented and discussed in detail in European Patent Application 89310667.4 published Apr. 25, 1990.

U.S. Pat. No. 4,397,981 discloses the use of organic halogen compounds, such as chlorinated polyethylene, to impart flame retardance to moisture curable random copolymers of olefins and olefinically unsaturated silane compounds. The reference states that undesirable premature crosslinking is obtained when certain halogenated organic compounds are employed. This adversely affects processability and results in extrudates with undesirable surface blemishes.

It would be highly useful if flame retardant olefin-alkoxy silane copolymer compositions were available which exhibited good processability and improved cure rates. It would be even more advantageous if these flame retardant compositions could be acceptably cured under ambient conditions, i.e., without exposure to water baths or steam autoclaves, and if the resulting ambient cured product met all of the specifications of SAE J-1128 for thin wall crosslinked polyolefin insulated low tension primary cable. These and other advantages are realized with the compositions of the present invention which are defined in more detail to follow.

SUMMARY OF THE INVENTION

The flame retardant insulation compositions of the invention which exhibit enhanced curability are comprised of (a) 30 to 90 weight percent olefin-alkoxy silane copolymer derived from an α-olefin having from 2 to 8 carbon atoms and 0.25 to 20 percent by weight, based on the weight of the copolymer of an unsaturated alkoxy silane of the formula

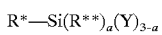

$$R^*-Si(R^{**})_a(Y)_{3-a}$$

wherein R* is an ethylenically unsaturated hydrocarbon radical having from 2 to 6 carbon atoms, R** is a hydrocarbon radical having from 1 to 10 carbon atoms, Y is an alkoxy group having from 1 to 4 carbon atoms and a is an integer from 0 to 2; (b) 5 to 40 weight percent halogenated organic compound; (c) 1 to 20 weight percent antimony trioxide; (d) 0.01 to 2.5 weight percent silanol condensation catalyst; and (e) 1 to 40 weight percent magnesium hydroxide. Optional ingredients such as hindered phenol antioxidants and mineral fillers may also be included in the formulations.

In one embodiment of the invention the olefin-alkoxy silane copolymer is an ethylene-vinyltrialkoxysilane copolymer. In another highly useful embodiment the halogenated flame retardant is an organic compound wherein the halogen, preferably bromine, is bonded to an aromatic or cycloaliphatic ring. Decabromodiphenyl ether and decabromodiphenyl ethane are particularly advantageous flame retardants for the compositions of the invention. In yet another preferred embodiment, the silanol condensation catalyst is dibutyltin dilaurate or dioctyltin maleate.

Electrical wires or cables consisting of a metal conductor coated with from 2 to 100 mils of the flame retarded insulation compositions are also disclosed.

DETAILED DESCRIPTION OF THE INVENTION

Polymers used in the practice of this invention, i.e., the base resins, are olefin-alkoxy silane copolymers and include randomly copolymerized products and grafted products. More specifically, the olefin-alkoxy silane copolymers are comprised of α-olefins having from 2 to 8 carbon atoms and unsaturated alkoxy silanes of the formula

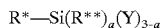

$$R^*\text{—}Si(R^{**})_a(Y)_{3-a}$$

where $R^*$ is an ethylenically unsaturated hydrocarbon radical having from 2 to 6 carbon atoms, $R^{**}$ is a hydrocarbon radical having from 1 to 50 carbon atoms, Y is an alkoxy group having from 1 to 4 carbon atoms and a is an integer from 0 to 2. While the copolymers can have melt indexes from 0.1 up to about 400, melt indexes from 0.5 to 50 are more typical. Especially advantageous compositions highly useful for automotive wire and cable insulations are obtained using ethylene-alkoxy silane copolymers with melt indexes from 0.5 to 10.

Random copolymers of ethylene and unsaturated alkoxy silanes, such as vinyltrialkoxysilanes, are known. Such copolymers can be obtained in accordance with any of the recognized procedures such as those described in U.S. Pat. Nos. 3,225,018 and 3,392,156. Generally, these copolymerizations are carried out at high pressure and temperature in the presence of free radical initiators, most commonly organic peroxides. Copolymers wherein an unsaturated alkoxy silane is grafted onto an olefin polymer backbone are also known and can be prepared in accordance with conventional procedures. Free radical initiators are generally used to facilitate grafting alkoxy silanes onto the polyolefins.

The unsaturated alkoxy silane will constitute from about 0.25 to 20 percent by weight and, more preferably, from about 0.5 to 10 percent by weight of the olefin copolymer. In a highly useful embodiment of this invention, the unsaturated alkoxy silane is a vinyltrialkoxysilane, i.e., where $R^*$ is a vinyl group and a is 0. It is especially advantageous to utilize vinyltrimethoxysilane or vinyltriethoxysilane, i.e., where $R^*$ is a vinyl group, a=0 and Y is methoxy or ethoxy, respectively.

α-Olefins containing 2 or 3 carbon atoms are most commonly present with the alkoxy silane to obtain the copolymers of the invention; however, minor amounts of higher α-olefins may also be included. Mixtures of two or more α-olefins, e.g., ethylene and propylene, can be polymerized with the unsaturated alkoxy silane or polymers derived from such olefin mixtures may be grafted with the unsaturated alkoxy silane. While polyethylene is the polymer substrate most commonly grafted, copolymers of ethylene with propylene, butene-1 and hexene-1 are also suitable. When the α-olefin and unsaturated alkoxy silane are copolymerized, ethylene is preferably the predominant monomer particularly when the alkoxy silane is vinyltrimethoxysilane or vinyltriethoxysilane. If the olefin copolymer is comprised only of an α-olefin and unsaturated alkoxy silane, the α-olefin will constitute from 80 to 99.75 weight percent and, more preferably, 90 to 99.5 weight percent of the polymer.

Other monomers may also be included with the α-olefin and unsaturated alkoxy silane. Such comonomers include vinyl esters of $C_{2-6}$ aliphatic carboxylic acids, $C_{1-6}$ alkyl acrylates, and $C_{1-6}$ alkyl methacrylates. The comonomers can be copolymerized with the unsaturated alkoxysilane and α-olefin or the unsaturated alkoxy silane can be grafted onto the copolymer obtained from the copolymerization of the α-olefin and comonomer. When comonomers are present, the copolymer will comprise 55 to 99.5 percent α-olefin, 0.25 to 20 percent unsaturated alkoxy silane and 0.25 to 45 percent comonomer(s). More commonly, the copolymers will contain 55 to 99 percent α-olefin, 0.5 to 10 percent unsaturated alkoxy silane and 0.5 to 40 percent comonomer. Preferred vinyl esters of $C_{2-6}$ aliphatic carboxylic acids include vinyl acetate and vinyl butyrate whereas methyl acrylate, ethyl acrylate and n-butyl acrylate are particularly useful $C_{1-6}$ alkyl acrylate comonomers. Methyl methacrylate and ethyl methacrylate are particularly useful $C_{1-6}$ alkyl methacrylate comonomers.

In a highly useful embodiment of the invention the polymer is an ethylene-vinyltrimethoxysilane (EVTMOS) copolymer or ethylene-vinyltriethoxysilane (EVTEOS) copolymer. In an even more preferred embodiment, the EVTMOS or EVTEOS copolymers are random copolymers.

One or more halogenated organic compounds are included with the base resin to impart flame retardance. Any of the well known and commonly used chlorinated and brominated aliphatic or aromatic organic compounds can be employed, such as chlorinated paraffins, chlorinated polyethylene, chlorinated naphthalene, brominated polystyrene, hexabromobenzene, pentabromodiphenyl oxide, and the like. Chlorinated and particularly brominated compounds wherein the halogen is attached, i.e., bonded, an aromatic or cycloaliphatic ring are especially useful for the compositions of the invention. The halogen can be attached to monocyclic, bicyclic or multicyclic rings and can be either chlorine or bromine; however, bromine is preferred. These halogenated compounds may also contain other functional groups which do not adversely affect the processing or physical characteristics of the composition.

Illustrative halogenated compounds having chlorine or bromine substituents on an aromatic or cycloaliphatic ring and which are useful include:

perchloropentacyclodecane;

Diels-Alder adducts of hexachlorocyclopentadiene with "enes" such as maleic anhydride;

hexabromobenzene;

pentabromoethylbenzene;

2,4,6-tribromophenol;

tribromophenyl allyl ether;

octabromodiphenyl;

poly(pentabromobenzyl) acylate;

pentabromodiphenyl ether;

octabromodiphenyl ether;

decabromodiphenyl ether;

decabromodiphenyl ethane;

tetrachlorobisphenol A;

tetrabromobisphenol A;

bis(dibromopropyl)ether of tetrabromobisphenol A;

tetrachlorophthalic anhydride;

tetrabromophthalic anhydride;

hexachloroendomethylenetetrahydrophthalic acid;

ethylene-bis(tetrabromophthalmide);

hexabromocyclododecane;

brominated polystyrene;

and the like.

In a highly useful embodiment of the invention, a brominated aromatic compound is utilized. Preferred brominated aromatic compounds correspond to the general formula

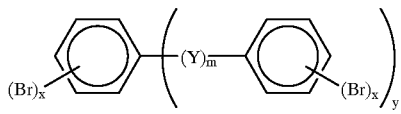

wherein x is an integer from 3 to 5; m is zero or 1; y is zero or 1; and Y is oxygen or a bivalent aliphatic radical of the formula

where n is an integer from 1 to 6. As is apparent from the above formula, the preferred aromatic bromine compounds may be comprised of one or two bromine-substituted aromatic rings. Illustrative radicals of the type Y include

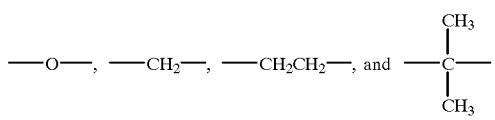

To minimize the amount of the brominated compound required in the formulation, the bromine content of the brominated aromatic compound should be greater than 50 percent and, more preferably, greater than 75 percent. It is also preferable that the brominated compound be a solid comprised of particles which do not exceed about 10 microns in size. This facilitates dispersing the compound in the base resin and makes it possible to produce extrudates with smooth surface appearance. Furthermore, to minimize volatilization and loss of the brominated compound during processing and extrusion, it is preferable that the material have a melting point above 200° C. and, more preferably, greater than 250° C. Since the brominated aromatic compounds typically melt over a range of temperatures, onset of melting should not occur before the above-specified temperatures are reached.

In one highly useful embodiment, the aromatic brominated compound is decabromodiphenyl oxide, also referred to herein as decabromodiphenyl ether, of the formula

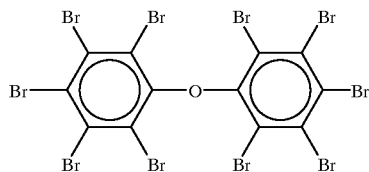

which is abbreviated herein as DBDPO. This commercially available material has a bromine content of 82–83 percent and melts over the range 290–310° C. The commercial product generally consists of a mixture of about 90 percent decabromodiphenyl oxide and about 10 percent nonabromodiphenyl oxide and other lower brominated species.

In another highly useful embodiment, the aromatic brominated compound is decabromodiphenyl ethane of the formula

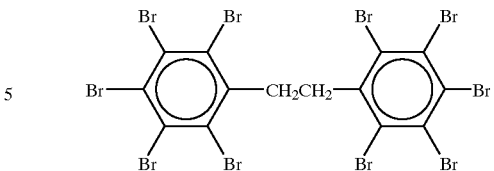

which is abbreviated herein as DBDPE. This commercially available product has a bromine content of 82 percent and initial melting point of 345° C.

Antimony trioxide ($Sb_2O_3$) is included in the compositions as a synergist for the halogenated compound. While it is possible to formulate without a synergist, flame retardance is increased when metal synergists are included and it is possible to reduce the amount of halogenated compound used. This latter feature is advantageous from an economic standpoint and also from the standpoint of maximizing physical properties and processability. While antimony trioxide is the synergist of choice, other known metal synergists such as antimony pentoxide, antimony silicates, boron compounds, tin oxide, zinc oxide, zinc borate, aluminum trioxide and aluminum trihydroxide may be utilized. The weight ratio of halogenated compound to synergist typically can range from about 2:1 up to about 5:1 and, more preferably, from about 2.5:1 to 4:1.

The compositions of the invention will also contain one or more silanol condensation catalysts. Silanol condensation catalysts are disclosed in the art for crosslinking alkoxysilane polymers and any of the known catalysts can be employed for the present invention. These catalysts generally include organic bases, carboxylic acids, and organometallic compounds including organic titanates and complexes or carboxylates of lead, cobalt, iron, nickel, zinc and tin. Dibutyltin dilaurate, dioctyltin maleate, dibutyltin diacetate, dibutyltin dioctoate, stannous acetate, stannous octoate, lead naphthenate, zinc caprylate, cobalt naphthenate; and the like. Tin carboxylates, especially dibutyltin dilaurate and dioctyltin maleate, are particularly effective for this invention.

Magnesium hydroxide is necessarily employed with the above ingredients to obtain the improved compositions of the invention. Mixtures which have $Mg(OH)_2$ as the predominant component, e.g., mixtures of $Mg(OH)_2$ with $MgCO_3$, can also be used. When magnesium hydroxide is used the resulting formulations meet all of the requirements of SAE J-1128 and also exhibit acceptable cure under ambient conditions. Quite unexpectedly, when mineral fillers, e.g., talc, and other hydrated fillers capable of releasing water e.g., alumina trihydrate (ATH), are employed as the sole filler, the compositions are deficient in one or more physical properties and/or curability.

To obtain the compositions of the present invention which are readily processable and curable under ambient conditions to produce insulation compounds which meet the specifications of SAE J-1128 for thin wall crosslinked polyolefin insulated low tension primary cable, 30 to 90 weight percent of the above described olefin-alkoxy silane copolymer is combined with 5 to 40 weight percent halogenated organic compound, 1 to 20 weight percent antimony trioxide, 0.01 to 2.5 weight percent silanol condensation catalyst and 1 to 40 weight percent magnesium hydroxide. In a more preferred embodiment, the compositions contain 40 to 75 weight percent olefin-alkoxy silane copolymer base resin, 7.5 to 25 weight percent halogenated organic flame retardant compound, 2 to 10 weight percent antimony trioxide, 0.1 to 1 weight percent silanol condensation catalyst and 3 to 20 weight percent magnesium hydroxide.

The magnesium hydroxide, halogenated organic flame retardant, antimony trioxide, silanol condensation catalyst, and any additional additives are incorporated into the ethylene-alkoxy silane copolymer using conventional mixing procedures known to the art. Internal mixers such as Banbury mixers, Farrel continuous mixers, Bolling Mixtrumat [trademark] mixers and Werner & Pfleiderer mixers are commonly used for this purpose. The ingredients may be added individually or combined for addition to the base resin. The use of masterbatches is highly advantageous for commercial operation. It is also possible to prepare a masterbatch, i.e., concentrate of some or all of the additives in a different resin and to add the masterbatch to the ethylene-alkoxy silane copolymer base resin. The resin used for the masterbatch will typically be an olefin polymer or copolymer resin, such as low density polyethylene, which exhibits good compatibility with the ethylene-alkoxy silane copolymer. Use of a masterbatch simplifies handling, especially when numerous additives are involved, and can facilitate incorporating difficultly dispersable additives.

While the above formulations provide a good balance of processability and physical properties, further improvements are possible by the incorporation of one or more additional additives. Other additives which can be present in the formulations include antioxidants, light stabilizing agents, optical brighteners, metal deactivators, lubricants, fillers, nucleating agents, pigments, antistatic agents, other non-halogenated flame retardants and the like.

Antioxidants are typically used for commercial insulation compositions to provide stabilization during processing and over the life of the wire/cable product. In general, from about 0.01 up to about 5 weight percent and, more preferably, from about 0.2 up to 2.5 weight percent antioxidant or antioxidant combination will be used for this purpose. Hindered phenol compounds are commonly employed for this purpose by themselves or in conjunction with hindered amines, thio compounds, phosphites, mercaptoimidazoles or the like. Any of the well known antioxidants having one or more hindered phenolic substituents can be used to stabilize the products of the invention. A comprehensive list of such compounds reference may be found in U.S. Pat. No. 4,318,845.

Hindered phenol compounds which are especially useful for the compositions of the invention will contain one or more substituted phenyl groups of the formula

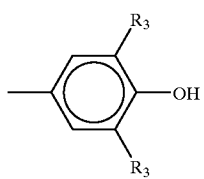

where $R_3$ is a $C_{1-4}$ alkyl group and, most preferably, a tertiary butyl group. The $R_3$ groups can be the same or different. Where more than one 3,5-dialkyl-4-hydroxyphenyl group is present, they will be joined through a linking group and the resulting compounds will correspond to the formula

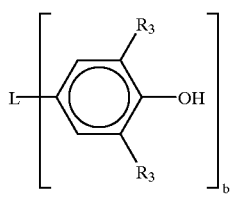

where b is an integer from 2 to 4 and L represents the linking group.

Representative linking groups include:

(a)
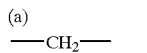

(b)

(c)
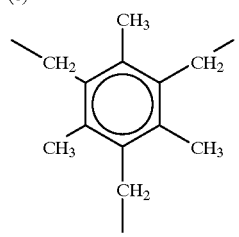

(d)
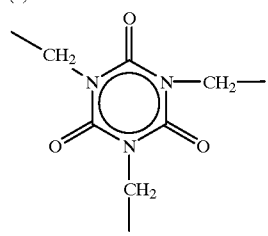

(e)
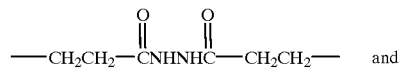 and (f)
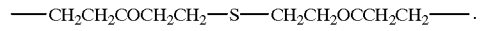

It is especially advantageous when the above-identified linking moieties are substituted with 3,5-di-t-butyl-4-hydroxyphenyl groups or 3-t-butyl-5-methyl-4-hydroxyphenyl groups.

Especially useful hindered phenol compounds of the above type which can be employed for the flame retardant products of the invention include:
4,4'-Methylenebis(2,6-di-t-butylphenol);
Tetrakis[methylene(3,5-di-t-butyl-4-hydroxyhydrocinnamate)]methane;
1,3,5-Trimethyl-2,4,6-tris(3,5-di-t-butyl-4-hydroxybenzyl)benzene;
1,3,5-Tris(3,5-di-t-butyl-4-hydroxybenzyl)-s-triazine 2,4,6 (1H,3H,5H)trione;
N,N'-Bis[3-(3,5-di-t-butyl-4-hydroxyphenyl)propanyl] hydrazine;
Octadecyl 3,5-di-t-butyl-4-hydroxyhydrocinnamate; and
Thiodiethylenebis-(3,5-di-t-butyl-4-hydroxy) hydrocinnamate.
All of the foregoing materials are commercially available. For example, octadecyl 3,5-di-t-butyl-4- hydroxyhydrocinnamate and tetrakis[methylene (3,5-di-t-butyl-4-hydroxyhydrocinnamate)]methane are sold by Ciba-Geigy under the respective trademarks IRGANOX® 1076 and IRGANOX® 1010. Thiodiethylene bis-(3,5-di-t-butyl-4-hydroxy)hydrocinnamate is sold by Ciba-Geigy under the trademark IRGANOX® 1035.

Illustrative hindered amines, thio compounds and phosphites which can be utilized in conjunction with the hindered phenol(s) include:

(1) Aminoaryl compounds such as phenyl-1-naphthylamine; phenyl-2-naphthylamine; N,N'-di-phenyl-p-phenylenediamine; octylated diphenylamine; nonylated diphenylamine; N-phenyl-N'-cyclohexyl-p-phenylenediamine; N,N'-di-sec.octyl-p-phenylenediamine and the like. Secondary aromatic amines are a particularly useful class of aminoaryl antioxidants.

(2) Thio compounds, such as the thioester synergists including dilauryl thiodipropionate and distearyl thiodipropionate, dioctadecyl sulfide, pentaerythritol betaalkylthiopropionates such as pentaerythritol tetrakis (betalaurylthiopropionate), and the like.

(3) Organic phosphites such as tetrakis-(2,4-di-t-butyl-phenyl)-4,4'-biphenylylenediphosphonite; tris-(2,4-di-t-butyl-phenyl)-phosphite; distearyl-pentaerythrityl-diphosphite; and alkanolamine esters of 1,1-biphenyl-2,2-diyl- and alkylidene-1,1-biphenyl-2,2-diyl-cyclic phosphites. These latter compounds are a particularly useful class of phosphites and are disclosed in U.S. Pat. Nos. 4,318,845 and 4,374,219.

In one highly useful embodiment of the invention, to provide flame retardant insulation compositions which exhibit good heat stability and which do not discolor or tarnish copper conductors to which they are applied, an antioxidant package comprised of specific hindered phenol (s) combined with a pentaerythritol betaalkylthiopropionate compound is employed. Such stabilizer combinations are disclosed in U.S. Pat. No. 5,225,468.

The pentaerythritol betaalkylthiopropionate will conform to the general formula

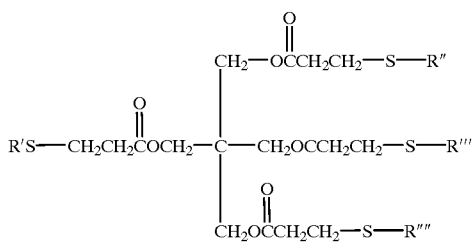

wherein R', R", R'" and R"" are alkyl groups having from 8 to 22 carbon atoms. Preferably, R', R", R'" and R"" will contain from 10 to 18 carbon atoms. The alkyl moieties may be the same or different and may be branched or linear. In an especially useful embodiment of the invention R', R", R'" and R"" are $C_{12}$ alkyl, i.e., lauryl, groups. Pentaerythritoltetrakis(betaalkylthiopropionates) corresponding to the above formula are commercially available from Argus Chemical Division, Witco Chemical Corporation, and pentaerythritol tetrakis (betalaurylthiopropionate) is sold under the trademark SEENOX® 412S.

In another highly useful embodiment of the invention wherein flame retardant insulation compounds having improved strip characteristics are produced, a stabilizer combination consisting of (i) tetrakis[methylene(3,5-di-tert-butyl-4-hydroxyhydrocinnamate)]methane, (ii) pentaeryth- ritol tetrakis(betalaurylthiopropionate) and (iii) thiodiethylene bis(3,5-di-tert-butyl-4-hydroxy)hydrocinnamate is employed. In an even more preferred embodiment the weight ratio of components (ii) and (iii) is from 0.1:1 to 2:1.

It may also be advantageous to include other fillers in amounts from about 0.5 up to 15 weight percent with the magnesium hydroxide to further enhance the properties of the composition for certain wire and cable applications. Fillers such as talc, clay, mica, hydrated alumina and the like can be used for this purpose with the proviso that the amount of the secondary filler does not exceed 15 weight percent, and preferably is less than 7.5 weight percent, and the total weight percent of magnesium hydroxide and secondary filler is less than 40 weight percent, and preferably less than 20 weight percent, of the total composition. If the optional filler is a hydrated filler, such as alumina trihydrate, additional improvement in flame retardance may result. Non-halogenated flame retardants, such as silicone gums, and polyphosphates may also be included in the formulations to further enhance flame retardant properties.

The flame retardant compositions of the invention are particularly useful as insulating coatings for metal conductors—especially copper and aluminum single or multi-strand wire and cable. The compositions are typically applied by extruding a substantially uniform 2 to 100 mil thick layer onto the metal conductor. More typically, insulation thickness will range from 5 to 60 mils. The compositions are especially useful for service as single layer low tension primary cable insulation, such as is used for automotive electrical applications. The compositions have a superior balance of processability and physical properties and, when properly formulated, do not significantly discolor or tarnish the surface of the metal conductor. They are readily strippable from the conductor and leave a clean, shiny surface.

As previously pointed out, the compositions of the invention are readily processable and, after extrusion and cure, the resulting insulation meets all of the specifications of SAE J-1128 for thin wall crosslinked polyolefin insulated low tension primary cable. Furthermore, these requirements are met by curing under ambient conditions, i.e., without contacting the coated wire or cable product with hot water or steam. The term ambient cure, as used herein, denotes crosslinking is achieved by exposure to existing temperature and humidity conditions. To be acceptable for commercial use, the compositions must crosslink to a sufficient level in as short a time as possible after extrusion so that the processor can use the wire for the manufacture of wire harnesses. Such manufacturing operations typically include cutting the wire, stripping the wire ends, soldering, crimping, shrink wrapping and the like all of which require that the insulation has achieved a certain minimum level of cure, generally considered to be about 50 percent for compositions based on olefin-alkoxy silane copolymers, i.e., gel content $\geq 50$ percent. Cure levels, as referred to herein, are synonymous with the percent gel content determined using ASTM D-2765. Also, the composition may continue to crosslink, albeit at a much slower rate, until eventually reaching approximately the same level of cure achievable if the product had been exposed to hot water or steam vulcanization. Although gel contents of 60 percent or greater can be achieved with compositions of the type used for the invention, little if any change in physical properties is observed after the cure exceeds about 50 percent.

The polymer compositions of the invention may also be used for other applications. For example, they can be extruded onto pipes and conduits for electrical and other applications. They can also be coextruded with one or more other thermoplastic materials to produce useful laminated constructions. Powders of these resins may be applied as coatings to either interior or exterior surfaces utilizing conventional powder coating procedures.

The following specific examples are provided to illustrate the flame retardant compositions of the invention and the manner in which the invention may be carried out. The examples are not intended to limit the invention and numerous variations within the scope of the invention will be apparent to those skilled in the art. In the examples, all parts and percentages are on a weight basis unless otherwise indicated.

The compositions used in the examples, including the comparative compositions, were prepared by dry blending an ethylene-vinyltriethoxysilane (EVTEOS) copolymer with a masterbatch containing the halogenated organic compound, antimony trioxide, silanol condensation catalyst and magnesium hydroxide. If any other compounding ingredients were employed for the formulation, they were also included in the masterbatch. The EVTEOS copolymer used had 2.4 weight percent vinyl triethoxysilane randomly copolymerized and had a melt index of 1. All of the masterbatches used a low density polyethylene (density 0.923; melt index 2.2) as the carrier resin. Additives were melt blended with the low density polyethylene (LDPE) in a Banbury mixer to obtain the masterbatch.

The resulting dry blend of EVTEOS copolymer and masterbatch was then extruded onto 20 AWG 7-stranded copper wire using a continuous wire coating line (Davis Standard 2½" screw 20:1 L/D with a Maddock mixing head) operating at a speed of 1000 feet per minute. A 16 mil thick coating of insulation was applied. The temperature profile of the extruder/mixer was maintained at 285° F./300° F./310° F./325° F. while the adapter and die head were maintained at 325° F. and 350° F., respectively. Wires coated with the composition of the invention were coiled onto spools using the machine takeup and stored on the spool under ambient laboratory conditions. The extent of cure was determined after 24 hours, 7 days and 14 days by determining gel content in accordance with ASTM D-2765.

Wires insulated with the compositions of the invention were evaluated following the procedures described in SAE J-1128 (March 1994, Proposal) for thin wall crosslinked (TXL) polyolefin insulated low tension primary cable. This standard covers low tension primary cable intended for use at a nominal system voltage of 50 volts rms or less in surface vehicle electrical systems. The tests are intended to qualify cables for normal applications with limited exposure to fluids and physical abuse. Required tests prescribed in Clause 4 of SAE J-1128 (March 1994, Proposal) for thin wall crosslinked polyolefin insulation include conductor area, strand coating, surface condition, maximum OD, minimum wall, mechanical properties, dielectric, cold bend, flame, fluid compatibility, ozone resistance, pinch, abrasion, crosslinking and strip force.

EXAMPLE I

An insulation formulation was prepared in accordance with the invention having the following overall composition:

| | |
|---|---|
| EVTEOS | 60 |
| LDPE | 8.5 |
| Decabromodiphenyl ethane | 16 |
| $Sb_2O_3$ | 6 |
| Dibutyltin dilaurate (DBTDL) | 0.3 |
| $Mg(OH)_2$ | 8 |
| Antioxidant[1] | 1.2 |

[1]The antioxidant was a mixture of two parts IRGANOX ® 1010, one part IRGANOX ® 1035 and one part SEENOX ® 412S.

The insulation after extrusion and storage for 24 hours under ambient conditions had a gel content of 40%. After 7 and 14 days storage, the gel content increased to 41.9% and 45.4%, respectively. Fifty-five percent cure, i.e., gel content of 55%, was achieved after about 4 weeks storage under ambient conditions. It is generally considered to be necessary in order to meet the crosslinking requirements of SAE J-1128 to have a cure level of at least 50%. At this cure level, the compositions of the invention also met or exceeded all of the other specifications of SAE J-1128 for thin wall crosslinked (TXL) polyolefin insulated cable and were otherwise suited for manufacture and assembly into wire harnesses.

To demonstrate the ability of the above composition, when cured under ambient conditions, to achieve essentially the same properties obtained if the composition is cured using hot water, the following comparison is provided. Various properties were determined for the composition cured for 24 hours in a 94° C. water bath and having a gel content of 67.3% and compared with the same properties determined for the composition cured under ambient conditions to a gel content of 56.1%. The results are set forth below along with the SAE J-1128 specification for the property for 20 AWG thin wall crosslinked polyolefin insulated cable.

| | Ambient Cured | Hot Water Cured | SAE J-1128 Specification |
|---|---|---|---|
| Flame (seconds) | 1.7 | 1.0 | ≦70 |
| Strip force (lbs) | 5.90 | 6.34 | ≧4.5 |
| Pinch (lbs) | 6.8 | 7.3 | ≧6 |
| Fluid compatibility (%) (engine oil) | 3.10 | 3.24 | ≦15 |
| Physical Properties (unaged): | | | |
| Tensile strength (psi) | 2110 | 1910 | ≧1500 |
| Elongation (%) | 266 | 220 | ≧150 |
| Physical Properties (aged): | | | |
| % of Original Tensile | 93 | 122 | ≧80 |
| % of Original Elongation | 94 | 96 | ≧50 |

EXAMPLE II

To illustrate the ability to vary the formulations of the invention and to include an additional filler material with the magnesium hydroxide, the following composition was prepared.

| | |
|---|---|
| EVTEOS | 60 |
| LDPE | 8.5 |
| Decabromodiphenyl ethane | 16 |

-continued

| | |
|---|---|
| Sb₂O₃ | 6 |
| Dibutyltin dilaurate (DBTDL) | 0.3 |
| Mg(OH)₂ | 4 |
| Antioxidant | 1.2 |
| Talc | 4 |

Ingredients employed for the above formulation were the same as in Example I. The composition was extruded onto 20 AWG 7-stranded copper wire. After storage for 24 hours under ambient conditions the insulation had a gel content of 34.2% which increased to 43.2% after 13 days additional storage. Fifty percent cure was achieved when the insulated wire was stored for 4 weeks under ambient conditions.

To expedite determination of the properties of substantially fully cured composition, wires insulated with the compositions were exposed to 94° C. water for 24 hours and evaluated in accordance with the procedures of Clause 4 of SAE J-1128. The cured insulation (65.8% gel) met all of the test specifications of SAE J-1128 for 20 AWG TXL polyolefin insulated cable and the values obtained in the flame, strip force, pinch, fluid (engine oil) compatibility and physical property tests were as follows.

| | |
|---|---|
| Flame (seconds) | 3.7 |
| Strip force (lbs) | 6.70 |
| Pinch (lbs) | 7.0 |
| Abrasion resistance (inches) | 15.3 |
| Fluid compatibility (%) | 2.69 |
| Physical Properties (unaged): | |
| Tensile strength (psi) | 1780 |
| Elongation (%) | 230 |
| Physical Properties (aged): | |
| % of Original Tensile | 120 |
| % of Original Elongation | 100 |

COMPARISON EXAMPLES A AND B

To demonstrate the unexpected results achieved with the compositions of the invention which utilize magnesium hydroxide in conjunction with a silanol condensation catalyst and flame retardant additives, identical compositions were prepared for comparison purposes substituting talc and alumina trihydrate (ATH) for the magnesium hydroxide. ATH is a hydrated filler similar to magnesium hydroxide and widely used for the formulation of wire and cable products. The comparative compositions were identical to the formulation of Example I except that the magnesium hydroxide was replaced in one instance with talc and in the second instance with ATH. The compositions were comprised as follow:

| | COMPARISON A | COMPARISON B |
|---|---|---|
| EVTEOS | 60 | 60 |
| LDPE | 8.5 | 8.5 |
| Decabromodiphenyl ethane | 16 | 16 |
| Sb₂O₃ | 6 | 6 |
| Dibutyltin dilaurate (DBTDL) | 0.3 | 0.3 |

-continued

| | COMPARISON A | COMPARISON B |
|---|---|---|
| Antioxidant | 1.2 | 1.2 |
| Talc | 8 | — |
| ATH | — | 8 |

Comparative Products A and B were extruded onto 20 AWG 7-stranded copper wire in accordance with the usual procedure and the coated wires stored under ambient conditions. There was no discernible cure, i.e., 0% gel, with Comparative Product A after 24 hours and it required 6 weeks storage to achieve 50% cure. When wire coated with Comparative Product A was cured in 94° C. water for 24 hours, the cured insulation (68.4% gel) met all of the requirements of SAE J-1128 for TXL insulated cable. Flame retardance of Comparative Product A was, however, significantly lower than obtained with the product of Example I. In the flame test, a burn time of 21.1 seconds was obtained and during the burn significant dripping occurred which is generally considered to be undesirable as it is a mechanism by which fire spreads. No dripping was observed with the product of Example I. A uniform char occurred at the point of ignition.

With Comparative Product B, 35.2% gel was obtained after 24 hours cure under ambient conditions and 50% cure was obtained after 4 weeks storage. While acceptable levels of cure were achieved with the composition formulated with ATH, the cure rate, is significantly slower than that obtained with the product of Example I. Also, when Comparative Product B was cured in water at 94° C. for 24 hours, the resulting product (66.7% gel) did not meet the pinch specifications of SAE J-1128 for TXL polyolefin insulated cable. A pinch value of only 5.3 lbs was obtained which is below the 6 lb minimum of SAE J-1128 for 20 AWG TXL cable. Furthermore, the burn time obtained with Comparative Product B, while meeting the SAE J-1128 requirements for 20 AWG TXL cable, was 7.2 seconds which is inferior to that obtained with the product of Example I. Slight dripping was also observed during burning which, as previously indicated, is undesirable.

We claim:

1. A flame retardant composition consisting essentially of (a) 30 to 90 weight percent olefin-alkoxy silane copolymer derived from an α-olefin having from 2 to 8 carbon atoms and 0.25 to 20 percent by weight, based on the weight of the copolymer, of an unsaturated alkoxy silane of the formula $$R^*\text{—}Si(R^{**})_a(Y)_{3-a}$$

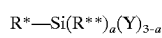

wherein R* is an ethylenically unsaturated hydrocarbon radical having from 2 to 6 carbon atoms, R** is a hydrocarbon radical having from 1 to 10 carbon atoms, Y is an alkoxy group having from 1 to 4 carbon atoms and a is an integer from 0 to 2; (b) 5 to 40 weight percent of a brominated aromatic compound selected from the group consisting of decabromodiphenyl oxide and decabromodiphenyl ethane, (c) 1 to 20 weight percent antimony trioxide; (d) 0.01 to 2.5 weight percent silanol condensation catalyst; and (e) 1 to 40 weight percent magnesium hydroxide.

2. The flame retardant composition of claim 1 wherein (a) is a copolymer of ethylene and 0.5 to 10 weight percent unsaturated alkoxy silane wherein R* is vinyl and a is 0.

3. The flame retardant composition of claim 2 which contains 40 to 75 weight percent (a), 7.5 to 25 weight percent (b), 2 to 10 weight percent (c), 0.1 to 1 weight percent (d) and 3 to 20 weight percent (e).

4. The flame retardant composition of claim 3 wherein (a) is a copolymer of ethylene and vinyltrimethoxysilane or vinyltriethoxysilane.

5. The flame retardant composition of claim 3 wherein (d) is dibutyltin dilaurate or dioctyltin maleate.

6. The flame retardant composition of claim 3 which additionally contains 0.5 to 15 weight percent mineral filler selected from the group consisting of talc, clay, mica and hydrated alumina with the proviso that the sum of the weight percentages of (e) and said mineral filler does not exceed 40 weight percent.

7. The flame retardant composition of claim 6 wherein (a) is a copolymer of ethylene and vinyltrimethoxysilane or vinyltriethoxysilane.

8. The flame retardant composition of claim 6 wherein (b) is decabromodiphenyl oxide or decabromodiphenyl ethane.

9. The flame retardant composition of claim 6 wherein (d) is dibutyltin dilaurate or dioctyltin maleate.

10. The flame retardant composition of claim 6 which contains 0.5 to 7.5 weight percent talc.

11. The flame retardant composition of claim 3 which additionally contains 0.01 to 5 weight percent antioxidant.

12. The flame retardant composition of claim 11 wherein (a) is a copolymer of ethylene and vinyltrimethoxysilane or vinyltriethoxysilane.

13. The flame retardant composition of claim 11 wherein (b) is decabromodiphenyl oxide or decabromodiphenyl ethane.

14. The flame retardant composition of claim 11 wherein (d) is dibutyltin dilaurate or dioctyltin maleate.

15. The flame retardant composition of claim 11 wherein the antioxidant is a hindered phenol selected from the group consisting of 4,4'-methylenebis(2,6-di-t-butylphenol); tetrakis[methylene(3,5-di-t-butyl-4-hydroxyhydrocinnamate)]methane; 1,3,5-trimethyl-2,4,6-tris(3,5-di-t-butyl-4-hydroxybenzyl)-benzene; 1,3,5-tris(3,5-di-t-butyl-4-hydroxybenzyl)-s-triazine 2,4,6 (1H,3H,5H) trione; N,N'-bis[3-(3,5-di-t-butyl-4-hydroxyphenyl)propanyl]hydrazine; octadecyl 3,5-di-t-butyl-4-hydroxyhydrocinnamate; thiodiethylene bis-(3, 5-di-t-butyl-4-hydroxy)hydrocinnamate; and mixtures thereof.

16. The flame retardant composition of claim 11 wherein the antioxidant is a mixture of pentaerythritol tetrakis (betalaurylthiopropionate) and one or more hindered phenols selected from the group consisting of 4,4'-methylenebis (2,6-di-t-butylphenol); tetrakis[methylene(3,5-di-t-butyl-4-hydroxyhydrocinnamate)]methane; 1,3,5-trimethyl-2,4,6-tris(3,5-di-t-butyl-4-hydroxybenzyl)-benzene; 1,3,5-tris(3,5-di-t-butyl-4-hydroxybenzyl)-s-triazine 2,4,6 (1H,3H,5H) trione; N,N'-bis[3-(3,5-di-t-butyl-4-hydroxyphenyl)propanyl]hydrazine; octadecyl 3,5-di-t-butyl-4-hydroxyhydrocinnamate and thiodiethylene bis-(3,5-di-t-butyl-4-hydroxy)hydrocinnamate.

17. The flame retardant composition of claim 16 wherein the antioxidant is a mixture of pentaerythritol tetrakis (betalaurylthiopropionate); tetrakis[methylene (3,5-di-t-butyl-4-hydroxyhydrocinnamate)]methane; and thiodiethylene bis-(3, 5-di-t-butyl-4-hydroxy)hydrocinnamate.

18. The flame retardant composition of claim 1 which meets all of the requirements of SAE J-1128 for thin wall crosslinked polyolefin insulated low tension primary cable when cured under ambient conditions.

* * * * *